Oct. 14, 1930.  H. C. LORD  1,778,197
JOINT MECHANISM
Filed Jan. 21, 1927
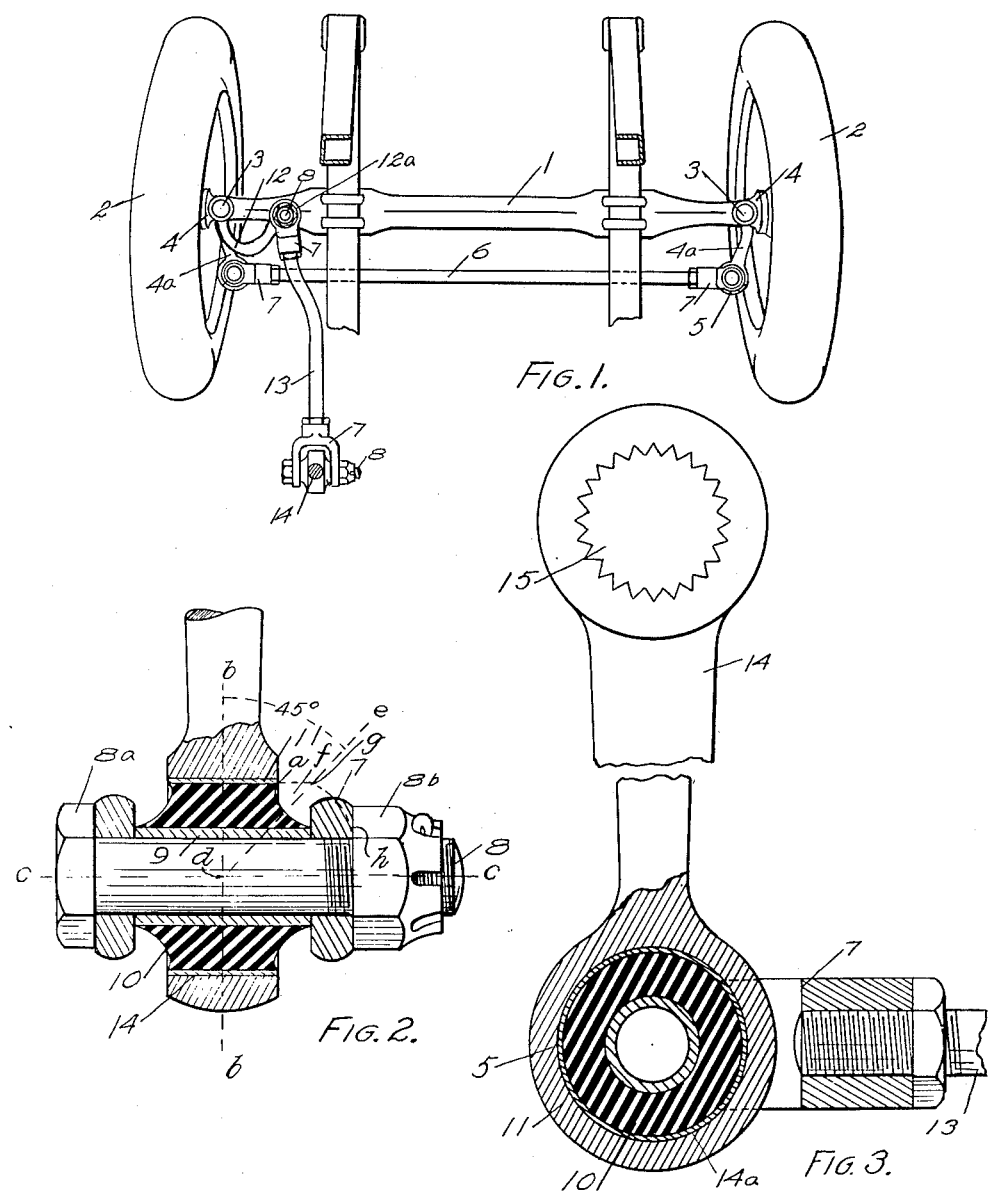
INVENTOR.
Hugh C. Lord Patented Oct. 14, 1930

1,778,197

UNITED STATES PATENT OFFICE

HUGH C. LORD, OF ERIE, PENNSYLVANIA

JOINT MECHANISM

Application filed January 21, 1927. Serial No. 162,606.

The present invention is directed to joint mechanisms in which there is a wobble movement of one member relatively to the other which, in the preferred joint mechanism, involves an oscillatory movement on more than one axis. It is particularly useful with joints having a comparatively large movement about one axis and a comparatively small movement about another axis, as for example the joints at the outer ends of the drag link in tie rods of an automobile.

A preferred embodiment of the invention is illustrated in the accompanying drawings as follows:—

Fig. 1 shows a plan view of the front axle of an automobile with a steering gear thereon.

Fig. 2 an enlarged sectional view of one of the joints on the line 2—2 in Fig. 3.

Fig. 3 a section on the line 3—3 in Fig. 2.

1 marks an automobile axle, 2 the front wheels, and 3 the king bolts, the front wheels being slightly off perpendicular. Knuckles 4 are journaled on the king bolts and carry the wheels and are provided with the usual arms 4ª. A tie rod 6 extends between the arms and terminates in clevises 7.

Each joint is provided with the clevis 7 and a bolt 8 extending between the arms of the clevis, said bolt having a head 8ª and a clamping nut 8ᵇ. The bolt extends through an inner joint member 9 in the form of a metallic sleeve. A rubber joint member 10 is arranged on the sleeve 9 and within a shell 11. The shell is pressed into sockets 5 in the knuckle arms.

Preferably the rubber is secured to the surfaces of the inner and outer joint members by uniting the engaging surfaces and this can be particularly well accomplished during vulcanization. A drag link arm 12 is secured to one of the knuckles and a drag link 13 extends from this arm to a rock arm 14 of the steering gear, the rock arm being fixed on a shaft 15 and swings on the axis of the shaft 15 in the usual manner. At the ends of the drag links there are joints exactly similar to those at the ends of the tie rods, namely having the clevises 7—7, the connecting bolts 8—8, and the rubber joint element pressed into an eye 12ª on the drag link arm 12 and 14ª on the steering gear arm. At the ends of the drag link it will be noted that there is oscillatory movement on the axis of the sleeve 9 of considerable amplitude and in addition thereto there is a swinging movement with an axis across the axis of the inner joint member. At the front end of the drag link this cross swinging is due to the raising and lowering of the frame due to the swinging action and also to the arc of travel of the end of the arm 14. Similarly the joint at the lower end of the arm 14 has an oscillatory movement due to the swinging of the arm on the axis of the sleeve 9 and also a cross movement due to the arc of travel of the end of the arm 12.

The shell 11 is short compared to the diameter of the joint. Consequently if the joint is swung across the axis the movement at the ends of the outer shell is more nearly in line with the axis of the joint member than a radial direction. It will be understood that this cocking of the shell 11 due to this swinging on this cross axis tends to compress the rubber at opposite ends and diagonally across the rubber. If the rubber is comparatively short the radial movement at the ends of the shell is less pronounced than with a shell that is longer as compared to its diameter. It is this stressing of the rubber that limits the cross swinging of the joint. I prefer, therefore, to have the meeting points $a$ of the ends of the rubber with the shell positioned at less than an angle of 45° from a plane indicated at $b$—$b$ in Fig. 2 and perpendicular to the longitudinal axis $c$—$c$ with the vertex of the angle at the radial and axial center $d$ of the joint. It will be seen that the 45° line $d$—$e$ is some distance from the meeting points $a$ between the rubber and the shell and the arc $a$—$f$ is more nearly axial than radial so that the rubber at the ends is moved somewhat in an endwise direction as the joint is flexed crosswise; whereas, if the meeting points between the ends of the rubber and the shell were at the 45° line so as to move in an arc as $g$—$h$ the movement at the ends would be more nearly radial than axial with a consequent direct compression, and the crosswise flexing would, therefore, be reduced. I prefer to make the inner member of the joint slightly longer than the outer member so that the mass of rubber immediately surrounding the inner member will more nearly approximate the mass of rubber immediately adjacent to the outer shell and I also prefer to have the rubber at the ends extend inwardly from the path of movement of the end of the shell under the crosswise swinging of the joint. As shown the end of the rubber is cupped and this reduces the banking up of the rubber under the end of the shell as it is swung crosswise. Further I prefer to place the rubber in the joint under initial tension and this may be accomplished by bonding the rubber to the shell and pin during vulcanization. Upon the cooling of the rubber it shrinks sufficiently to put the rubber of the joint under initial tension. Consequently as the shell is cocked, or swung crosswise this initial tension at the point where the shell moves toward the inner pin 9 moves some distance in neutralizing the initial tension before compressing the rubber at this point and thus subjecting it to the stresses incident to this crosswise movement. With the rubber united with the engaging surfaces of the pin and shell it will be understood that if the pin is of the same length as the shell the bond at the pin, particularly at the tension side, is subject to a much greater breaking strain than the bond at the shell, because a much less area of bond must sustain the same load. By making the bonding surface at the pin longer the difference between the pin and shell as to bond area may be eliminated or reduced. This is of greater advantage with the rubber under initial tension, as the tension side of the joint then carries a greater proportion of the load.

With such a structure it is possible with joint mechanisms, such as tie rods, to accomplish the compound movement of the joints with a single joint, thus avoiding a multiplication of joints, or the forming of an ordinary knuckle joint at each end of the rod.

What I claim as new is:—

1. In a joint, the combination of an outer annular member, an inner member within the outer member, and a rubber member between the outer and inner members, said rubber member being longer at the inner member than at the outer member, the meeting points of the ends of the rubber member with the outer member being positioned at less than an angle of 45° from a plane perpendicular to the longitudinal axis with the vertex of said angle at the radial and axial center of the joint.

2. In a joint member, the combination of an annular outer member; an inner member within the outer member; and a rubber member between the outer and inner members, the rubber member being longer at the inner member than at the meeting points of its ends with the outer member and said rubber member having its ends cupped.

3. In a joint member, the combination of an annular outer member; an inner member within the outer member; and a rubber member between and engaging the inner and outer surfaces of the outer and inner members respectively, the rubber member being longer at the inner member than at the outer member, said rubber being united to the outer and inner members by a radial tension-resisting union between the engaging surfaces uniting the rubber member with the outer and inner members against separation under a direct radial pull between the rubber and members.

4. In a joint member, the combination of an annular outer member; an inner member within the outer member; and a rubber member between the outer and inner members, the rubber member being longer at the inner member than at the outer member, said rubber being united to the outer and inner members by vulcanization placing the rubber under initial radial tension.

In testimony whereof I have hereunto set my hand.

HUGH C. LORD.